(No Model.) 7 Sheets—Sheet 1.

A. KIRK.
NAVIGATION LOCK.

No. 385,359. Patented July 3, 1888.

Fig. 1.

Witnesses:
Frank C. Doty.
Wm. M. Evans.

Inventor:
Arthur Kirk,
by his attys
Bakewell & Kerr (No Model.) 7 Sheets—Sheet 2.

A. KIRK.
NAVIGATION LOCK.

No. 385,359. Patented July 3, 1888.

(No Model.) 7 Sheets—Sheet 3.

A. KIRK.
NAVIGATION LOCK.

No. 385,359. Patented July 3, 1888.

Fig. 3.

Witnesses
Inventor
Arthur Kirk.
by his attys
Bakewell & Kerr (No Model.) 7 Sheets—Sheet 4.

A. KIRK.
NAVIGATION LOCK.

No. 385,359. Patented July 3, 1888.

Witnesses
Jno. K. Smith.
B. D. Smith.

Inventor
Arthur Kirk
by his attys
Bakewell & Kerr (No Model.) 7 Sheets—Sheet 5.

A. KIRK.
NAVIGATION LOCK.

No. 385,359. Patented July 3, 1888.

Witnesses:
Jno. K. Smith.
B. D. Smith.

Inventor:
Arthur Kirk,
by his attys
Bakewell & Kerr (No Model.) 7 Sheets—Sheet 6.

A. KIRK.
NAVIGATION LOCK.

No. 385,359. Patented July 3, 1888.

Witnesses
Jno. K. Smith
B. D. Smith

Inventor
Arthur Kirk
by his attys
Bakewell & Kerr (No Model.)  7 Sheets—Sheet 7.

A. KIRK.
NAVIGATION LOCK.

No. 385,359.  Patented July 3, 1888.

Witnesses:
Jno. K. Smith,
B. D. Smith.

Inventor:
Arthur Kirk,
by his attys
Bakewell & Kerr

UNITED STATES PATENT OFFICE.

ARTHUR KIRK, OF SHARPSBURG, PENNSYLVANIA.

NAVIGATION-LOCK.

SPECIFICATION forming part of Letters Patent No. 385,359, dated July 3, 1888.

Application filed July 2, 1883. Serial No. 99,740. (No model.)

*To all whom it may concern:*

Be it known that I, ARTHUR KIRK, of Sharpsburg, in the county of Allegheny and State of Pennsylvania, have invented a new and useful Improvement in Navigation Locks and Dams; and I do hereby declare the following to be a full, clear, and exact description thereof.

My invention relates to improvements in the construction of bear-trap locks and dams, and is designed to accomplish the complete substitution of lock-gates constructed on this principle for the ordinary vertical gates now in use.

My present invention is more especially directed to the construction of the locks than to that of the dam proper.

To enable others skilled in the art to make and use my invention, I will now describe it by reference to the accompanying drawings, in which—

Fig. 3 is a section of the lower gate. The floor shown in plan in Fig. 4 has been omitted in Fig. 2, as it can be used in both or dispensed with, as preferred.

Like figures of reference indicate like parts in each.

Figure 1:
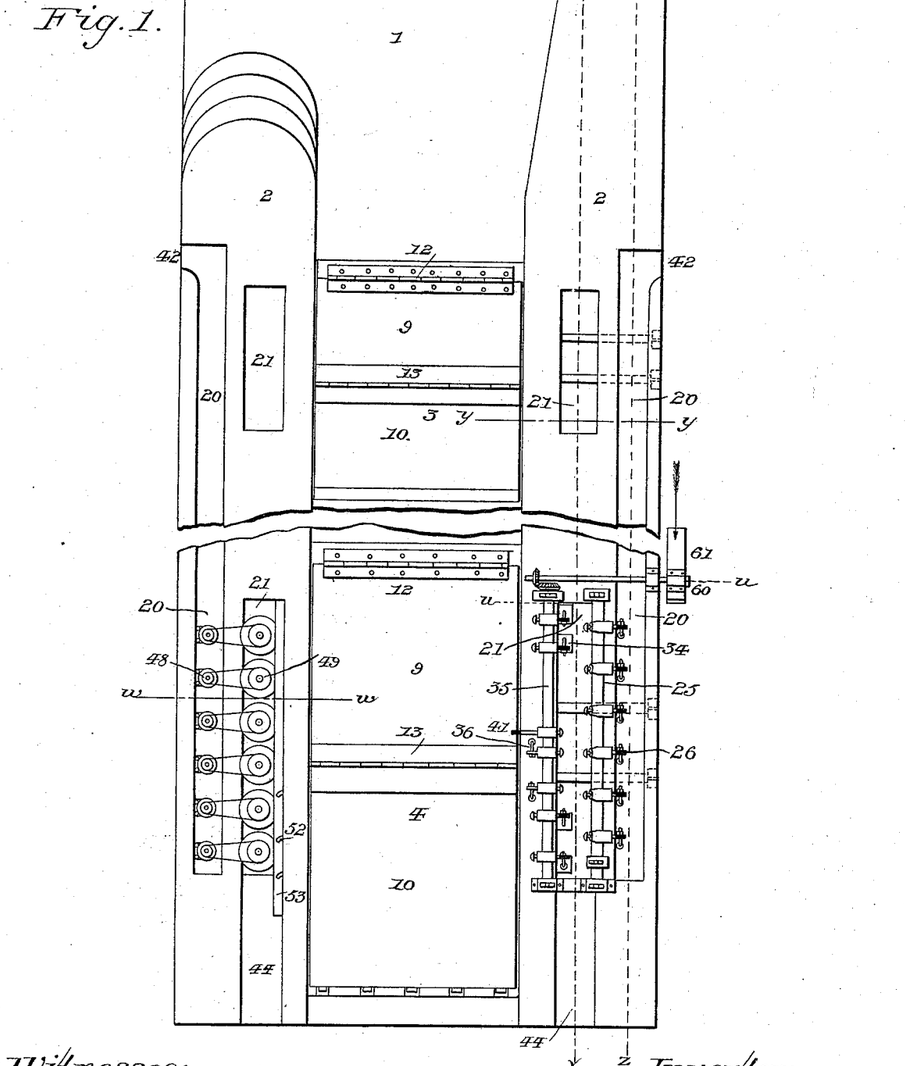
Figure 1 is a plan view of the lock, (parts being broken out,) showing the upper and lower gates, the two forebays 20, and the four second chambers 21. For purposes of clearness the devices for operating the valves, which are common to all of the second chambers 21, have been shown only in the second chamber in the right-hand upper corner, and the centrifugal pumps, which are or may be used in both chambers 21 of the lower gate, are shown only in the left-hand lower corner.

Referring now to Fig. 1, the entrance to the lock is indicated at 1. The sides of the lock are formed by walls 2 of the requisite height and thickness. In the bottom of the lock are two bear-trap gates, 3 4, constructed partially in accordance with my former Patent No. 268,411. The lock-basin in which the vessel rests in being transferred from one level to the other is that portion which extends between the two gates 3 and 4.

Figure 2:
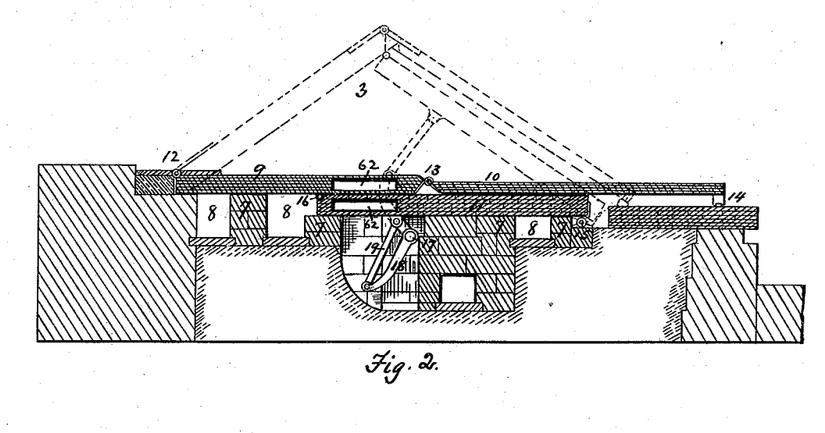
Fig. 2 is a section of the upper gate.
Figure 3:
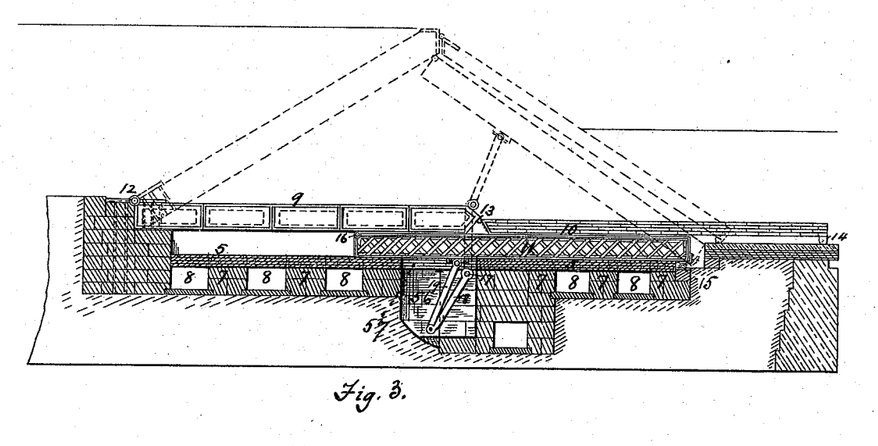
Figure 4:
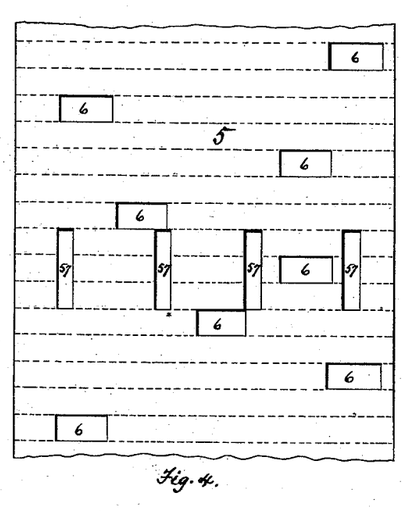
Fig. 4 is a plan view of part of the floor which I prefer to use.

A serious objection to bear-trap dams as gates for locks of long spans is that the water, being let in and out rapidly at one or both ends, produces an undulating motion in the leaves of the dam, which motion necessarily strains and twists and soon results in the destruction of the same. To obviate this objection I make use of the following construction:

Referring now to Figs. 3 and 4, it will be noticed that the lock-chamber is provided with a suitable floor, 5, (not shown in Fig. 2,) in which at various points under the gates 3 and 4 is a series of vertical openings, 6. The floor 5 rests upon transverse walls 7, between which are chambers 8, said chambers communicating with the ports 30, by which the water gains entrance below the gates 3 and 4 from the forebays of the lock, and with the discharge-passages 39, by means of the end passages, 70, which extend past the ends of the walls 7 and chambers 8. The channels 8, extending under the floor 5, which floor is composed of boards or stonework, distribute the water evenly therein and prevent its breast from coming against the leaves. When the water has filled the channels 8, it rises vertically against the under sides of the leaves of the gates, and so comes equally through all the openings 6. The result of this construction is that the raising and lowering power is distributed equally under the gates, and a guard is interposed to prevent the transverse rush of the water to or from the entrant ports from coming unequally upon the leaves and causes the water to change its direction and rise vertically against the leaves, so that the power to rise is applied simultaneously to all points, and when the water is withdrawn it recedes simultaneously from all points, thus causing the gates to rise and fall evenly.

The gates 3 and 4 are each composed of three separate leaves, 9, 10, and 11. The leaves 9 are hinged to the floor of the dam at 12. The leaves 10 are hinged to 9 at 13, and are provided with friction-rollers or blocks 14, by which they slide along the top of the floor. The leaves 11 are hinged to the floor at 15, and are provided with friction rollers or blocks 16 at the forward end, by which such end travels easily along the under side of the leaves 9 in raising the same. Below the floor is a shaft, 17, provided with an arm, 18, which is pivoted to a pitman, 19, said pitman being also pivoted to the under side of the lower leaf, 11. The shaft 17 extends transversely under the entire length of the gate, and at determined intervals is provided with the arms 18 and pitman 19. The purpose of this construction is to further insure the equal rise and fall of the leaves. This follows because the arms 18 are rigidly attached to the shaft, and no one can fall more rapidly than the other, because the turn of the shaft causes all to go down evenly, so that a pressure at any one point will cause the whole gate to descend by the turning of the shaft. In each of the side walls of the lock is a forebay, 20, in which the water stands on a level with that in the upper pool. The water is admitted from this forebay into second chambers 21, by which it is distributed to the gates 3 and 4 in the manner hereinafter described.

Figure 5:
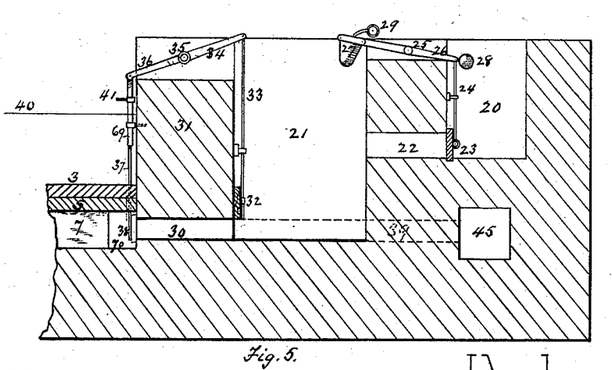
Fig. 5 is a transverse section of a forebay, 20, and second chamber 21, showing the devices for operating the valves. It is represented as on the line $y\ y$, of Fig. 1, or the forebay and second chamber of an upper gate, the mechanism for actuating the valves and the ports or passages 22 and 30 and their valves are of the same character in all the chambers 21, &c.

The forebays 20 are two in number, one on each side extending longitudinally for nearly the whole length of the lock, and the second chambers 21 are four in number, two on each side opposite the respective gates and between the forebays and the lock. The several forebays and second chambers are provided with connecting-ports, ports leading to the channels 8 below the gates and with valves and valve-operating mechanism, as shown in Fig. 5. There are some differences in the arrangement of the outlet-passages 39 of the upper and lower gates, and such differences will be hereinafter specifically pointed out after first describing the construction common to all, which is as follows:

Extending between the forebays 20, Fig. 5, and the chamber 21 are channels 22, which are controlled by suitable valves, 23, mounted on stems 24, extending to a rock-shaft, 25, pivoted in the division-wall. The rock-shaft 25 is operated by hand or by power, or in any other suitable way, whenever it is desired to open or close the valves 23. One means for effecting the automatic operation of the rock-shaft 25 is to provide the ends of the levers 26, each carrying a valve stem, 24, with tanks or buckets 27, having a small hole of any desired size in the lower end. On the other ends of the levers 26 are counter-weights 28, which, when the tanks 27 are empty, will cause the latter to rise and the valves 23 to close. By reversing the buckets 27 and counter-weights 28 the devices may be used to open the valves 23, if desired. A pipe, 29, extends along the side of the division-wall from a suitable tank or reservoir situated at any convenient place, and is provided with openings over the various tanks, 27, so that by turning a cock or opening a valve water may be caused to discharge into the tanks 27 and overbalance the levers 26 and thereby open or close the valve, as desired. The water in the tanks 27 gradually flows out from the small hole in the bottom, and its discharge causes the tanks to become lightened and to be raised by the counter-weights 28. The length of period during which the valves 23 remain open or closed by reason of the slow discharge of the tanks 27 may be fixed by adjusting the size of the openings in the bottom of the tanks 27 accordingly. Extending from each chamber 21 laterally into the chambers 8 under each of the gates are channels 30, Fig. 5, said channels passing through the division-wall 31. These channels are governed by valves 32, which are mounted on stems 33, connected to arms 34, said arms being mounted on the rock-shaft 35, and are for the purpose of governing the admission of the water into the chambers 8 under the gates 3 and 4. The rock-shaft 35 extends along the top of the wall 31 beside the gates, and at proper points is provided with other arms 36, extending in the opposite direction from that of the arms 34. These arms 36 are for controlling the valves 38 of the waste-ports or discharge-passages 39. On the shafts 35 of the upper second chambers 21 they are placed beyond the ends of said chambers 21, (see Figs. 6 and 11,) as the passages 39 do not intersect said chamber 21, but pass above and below it, while on shaft 35 of the lower chambers, 21, they are placed nearly opposite to the middle of said chambers and of gate 4, because the discharge-channels 39 of the lower gates pass through the lower chambers, 21, and not around it as in the former case.

Pivoted to the ends of arms 36 are vertical valve-stems 37, Fig. 5, which are connected to and operate the valves 38 of the outlet-passages 39.

The valves 38, as shown in Fig. 5, are sufficient for the passages 39 of the upper gate, as said passages pass around the upper second chambers 21 and said upper chambers 21 connect with the passages 39 and through said passages with the main discharge 45 by means of the vertical overflow-passages or tail-chutes 43; (see Figs. 6, 7, and 11;) but in the case of the lower second chambers 21, as the passages 39 pass through said chambers 21 a second set of valves, 68, (see Fig. 8,) are arranged at the mouth of the passages 39, where they connect with the main discharge-passage 45, so that the communication between lower chambers 21 and main discharge-passage 45 can be closed when passages 30 are open and also when the water is to be exhausted from below gate 4 by centrifugal pumps 49, as will hereinafter more fully appear.

The line 40, Fig. 5, indicates the height to which the gates 3 and 4 rise under usual circumstances. On a rod, 69, attached to an arm, 36, situated at or nearly opposite the middle of the gate, a short distance above this line, is a short arm or projection, 41, the purpose of which will be described. The rock-shaft 35 is operated by power in any desired manner. At the lower gate the valve-stems 37 being opposite to the gate, the projection 41 may be placed on one of them.

I will now describe the operation of this part of my improvement. The conditions of the lower gate, 4, being different from those of the upper gate, the discharge of the water from under it must be effected in a different way; but the construction and operation of the supply devices is the same for both upper and lower gates.

Figure 6:
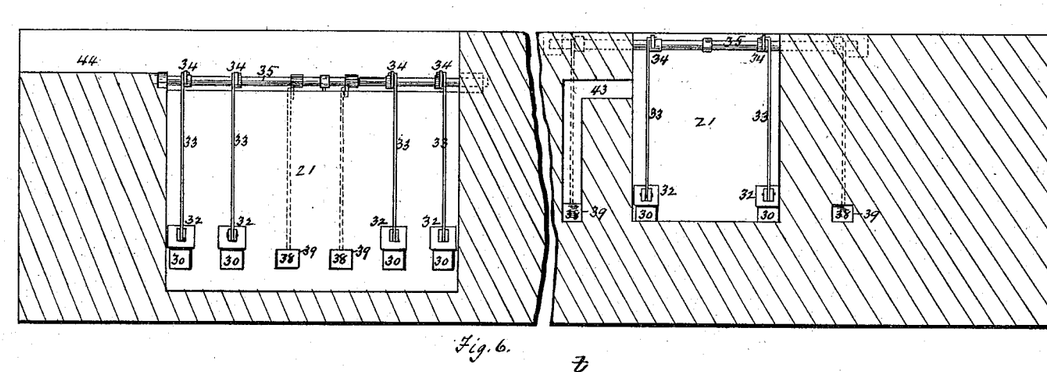
Fig. 6 is a longitudinal vertical section on the line $x\ x$ of Fig. 1, through the two second chambers 21, parts being broken out at the middle, as in Fig. 1.
Figure 7:
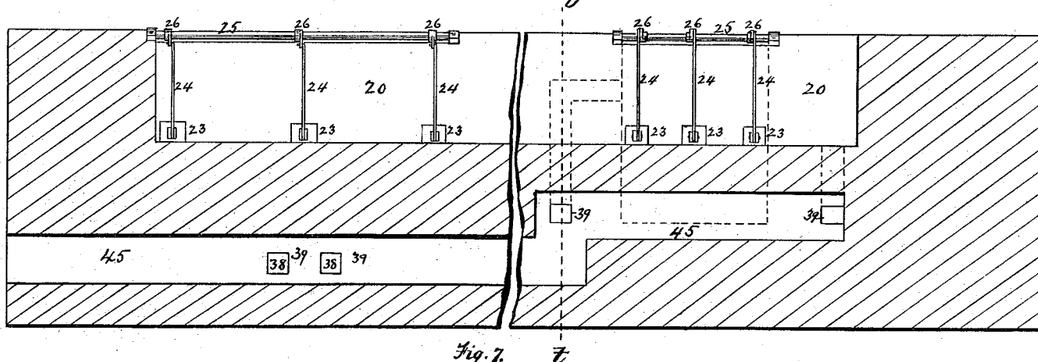
Fig. 7 is a similar section on the line $z\ z$, Fig. 1, through the forebay 20.
Figure 11:
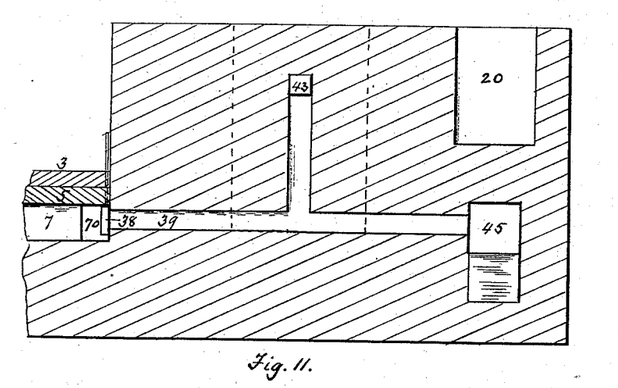
Fig. 11 is a cross-section of the wall on the line $t\ t$, Fig. 7, showing the relation of discharge-passage 39 and tail-chute 43 of the upper second chambers.

Fig. 5 is a cross-section of one of the side walls of the lock at the upper gate. It illustrates the construction and operation of the supply devices for both upper and lower gates; but as the lower gate is on a lower level and must be provided with water elevating and discharging devices, its chamber 21 is relatively much deeper than the chamber 21 of the upper gate, and the passage 39 communicates directly with its deep chamber 21. The water in the forebay 20 entering at the opening 42, Fig. 1, remains at the upper level of the stream. The valves 23 being opened the water passes through the passages 22 into the chambers 21; thence through the passages 30 to the chambers 8, which communicate with each other under the gates, raising the gates to the level of the water in chambers 21, which are provided with overflows or tail-chutes 43 and 44, Fig. 6, at such a level as will cause the water in chambers 21 to maintain only the desired height to hold up the gates. When it is desired to lower the gates, the valves 23 being shut, the rock-shafts 35 are turned so as to cause the valves 32 to close, shutting the inlet-ports 30, and the valves 38 to rise, opening the outlet-ports 39. The valves 68, Fig. 8, of the passages 39 of the lower chamber 21 are also opened. The water then flows out from under the gates and from the chambers 8, which all communicate with each other through the passages 30 into the main discharge-passages 45, Fig. 6. The inlet and outlet passages 30 and 39 are on the same level under each gate, but not in the same vertical planes, being side by side. The lower ends of the main discharge-passages 45 open into the lower pool of the stream at the lower end of the side walls, 2, of the lock. In addition to the discharge-passages 39 the tail-chutes 43 of the upper gate-chambers 21 open into the passages 39, and thus connect with main discharge-passages 45, as shown in Figs. 6, 7, and 11.

Figure 8:
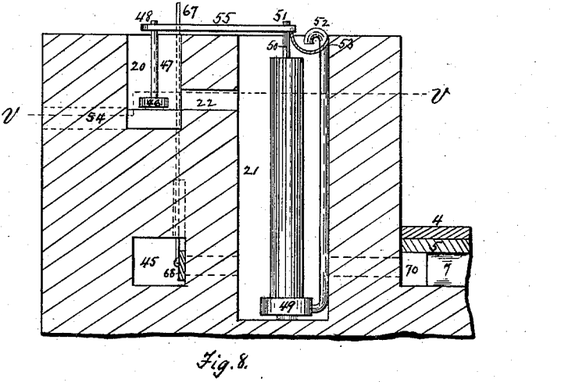
Fig. 8 is a vertical cross-section on the line $w\ w$, Fig. 1, Figs. 1 and 9 showing a lower secondary chamber, 21, and a forebay, 20, with the devices for raising and discharging the water from the lower chambers 21.

In case of an abnormal pressure being brought upon the under side of the gates by reason of the admission of too much water through the passages 30, their further rise will cause their upper surfaces to pass above the line 40 and to come in contact with the projections 41 on the rod 69, and thereby to turn the rock-shafts 35 and close or partially close the valves 32 and open the valves 38 to an equal extent until a passage of sufficient size for the escape of the excess of water in the chambers 21 is formed. This construction is therefore a safety device to protect the gates against damage from abnormal pressure. When the rise of the gates is sufficient to relieve the pressure, either by giving an additional outlet through the channels 39 or by throttling the entering-ports 30, an equilibrium will be established between the pressure in the chambers 21 and that under the gates, which will maintain the gates at a definite height. The upper gate, 3, being above the level of the lower pool, the discharge of the water from under it is effected by gravity alone; but the case is different with the lower gate, which when open is below the level of the stream, and it is necessary to provide means for withdrawing the water from beneath it when it is desired to open it. This is effected by the construction shown in Figs. 1, 8, and 9. The chambers 21 of the lower gate are made quite deep, extending below the level of the discharge-passages 39, as shown in Figs. 6 and 8. In Fig. 8 I do not show the arrangement of the valves for controlling the entering and discharge ports, but they are shown in Fig. 6, and are the same in all the compartments 21.

Figure 9:
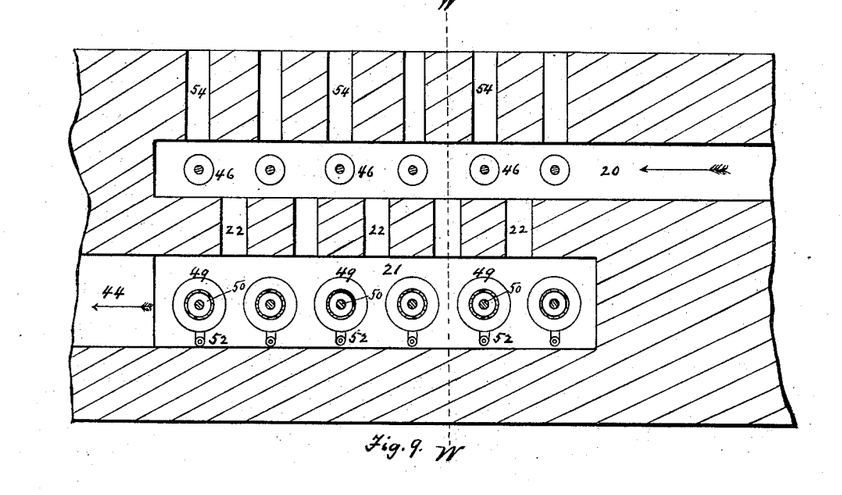
Fig. 9 is a horizontal section of the same on the line $v\ v$, Fig. 8.

In the forebays 20, opposite the lower chambers 21, I place a series of turbine wheels, 46, each provided with a shaft, 47, and a pulley, 48, and in the lower chambers 21, I place a series of centrifugal pumps, 49, which are operated by a shaft, 50, provided with a pulley, 51, and having a discharge tube or pipe, 52, which extends up to and discharges in a suitable trough or conduit, 53, by which the water is conducted to the tail-chute 44.

In the outer wall of the lock, opposite each turbine wheel 46, is a discharge outlet, 54, designed to produce a discharge stream for operating the turbine wheels. The turbine wheels operate the pumps by means of a belt, 55, or by means of a shaft and gearing. By this construction the water from under the gate 4 is withdrawn and discharged therefrom through the chutes 44.

The stems 37 of the outlet-valves 38 of the lower gate, 4, are provided with the same safety arrangement as that shown in Fig. 5, attached to rod 69. When the gate rises until it comes in contact with the projection 41, by reason of the abnormal pressure beneath it, it opens the outlet-valves 38 and partially closes the inlet-valves 32, thus throttling the flow of water from lower chamber 21. The main discharge 45 is below the level of the lower pool, the latter being such as to float a boat over the lower gate when the gate is down. As a consequence the lower gate cannot be completely drained through it; but as the crown of the lower gate when raised is much above the level of the lower pool it will be sufficiently drained to take off the abnormal pressure. When, as has been described, it is desired to lower the gate 4, the water beneath it must be exhausted by means of the centrifugal pumps. As, however, the discharge channel 45 communicates with the chambers 21, and they with chambers 8, below the gate, by means of channels 39, it would therefore be impossible to exhaust the water from under the gate without first closing valve 68, in order to prevent the reflux of water from channel 45. When, therefore, it is desired to lower the lower gate, the supply-valve 23 is first closed and the valves 38 and 68 opened until the water falls by gravity (passing through channels 39, chambers 21, and main channel 45) to the level of the water in the lower pool, after which the valve 68 is closed to prevent the reflux of water from main channel 45, and the centrifugal pumps 49 are set in operation to exhaust the water below the gate and which cannot escape by gravity.

In the lock described there are two gates, 3 and 4, two forebays, 20, one on each side, and four chambers, 21, inside of the forebays, one at each end of the two gates. Each chamber 21 is provided with a rock-shaft, 25, operated either automatically or by other means, and valves 23 for admitting the water thereto, and each gate is provided with rock-shafts 35, controlling and operating the entrant and exit valves, and with an automatic safety appliance, 41, whereby the gates are protected from injury by reason of undue pressure. The chambers 21 of the lower gate, 4, are each provided with the centrifugal pumps 49, operated by the turbines 46, by which the water is withdrawn from under the gate. In the drawings I have illustrated these features separately.

The conditions under which the upper and lower gates operate differ materially. With the lower gate there is a difficulty in lowering, owing to the impossibility of exhausting the water from under it by gravity. With the upper gate the trouble is just the other way—the gate must be raised with the pressure of the water of the upper pool exerted equally above and below it. Consequently the raising must be accomplished either slowly by the buoyancy of the gate or by power applied under the gate. The latter is an expensive and troublesome method. I obviate its necessity and accelerate the movement of the gate by providing the leaves 9, 10, and 11, Fig. 2, or one or more of them, with air-tight chambers 62, which give great buoyancy to the gate and cause its rapid and positive rise, when the water is admitted under it.

If desired, instead of making the leaves of the gates of boards, as shown at 10 in Fig. 3, they may be made of sheet-iron with flanged iron sides, as shown at 9, Fig. 3, or with lattice-work, as shown at 11, Fig. 3, or in any other desired and practicable manner. The pitmen 19 work in a pit or chamber, 56, up through the openings 57, Figs. 3 and 4, in the floor 5.

I do not limit myself to the precise construction of the devices described, except in so far as I hereinafter claim such construction separately; but I include all equivalent constructions of the elements of the combinations hereinafter specified; nor do I limit myself to a lock having two gates of the bear-trap form, as it is evident that another form may be substituted for one of the bear-trap gates shown, if desired; nor do I limit myself to the use of the devices for protecting the gate from injury by an abnormal pressure with both inlet and discharge valves, as it is evident that it may be used with either separately; nor do I limit myself to the use of the turbine wheels and centrifugal pumps for raising and discharging the water from below the gate, for the reason that other means may be applied for this purpose; nor do I limit myself to the use of turbine wheels for operating centrifugal pumps, for the reason that such wheels may be applied for operating other forms of pumps for the the same purpose.

Figure 10:
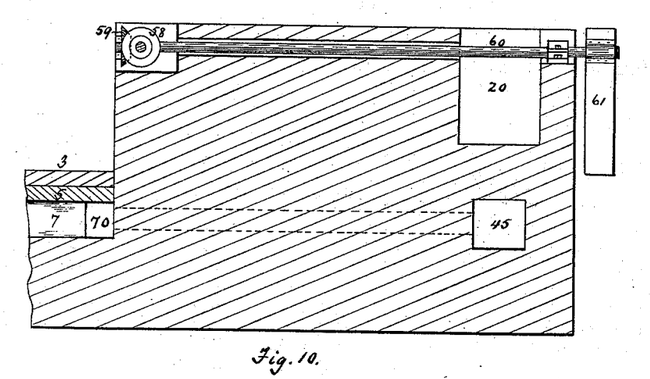
Fig. 10 is a vertical transverse section of the side walls on the line $u\ u$, Fig. 1, showing automatic mechanism for operating the valves and dropping the gates in case of the rising of the stream.

For the purpose of automatically dropping the gates in case of the rising of the stream, I have provided the following devices, (shown in Figs. 1 and 10:) On the shafts 35, I place a beveled pinion, 58, gearing into which is a beveled pinion, 59, mounted on a cross-shaft, 60. The shaft 60 extends through the wall and across the forebay 20, and at its outer end is fitted with a paddle, blade, or bucket, 61, which is rigidly secured thereto, and is placed at an angle inclining up the stream, the lower end being at the proper point to be caught by the stream as it rises to the height when it is desired to open the valves. Then when the water rises the current catches the lower end of the bucket 61 and causes it to be swept downward and turn the shaft 60, which, as before stated, being connected by the gearing to the shaft 35, turns the latter and opens the outlet-valves. The pressure of the water on the gates then causes the latter to fall.

I do not limit myself to any particular construction of the devices connecting the bucket 61 with the valves, but include within my invention, broadly, any devices which transmit the power of the former to the latter when the river reaches any desired height.

If desired, the passages 22 may be omitted and the water transferred from the forebays 20 to the chambers 21 by pumps of any suitable description. This is of use when it is desired to raise the level of the water above that of the water in the upper pool and so force the gates to rise in the same manner as if the water came from a higher elevation. It is not necessary to dispense with the passages 22, as this may be accomplished by simply closing the valves 23, Fig. 5.

What I claim as my invention, and desire to secure by Letters Patent, is—

1. A bear-trap dam having a series of chambers extending longitudinally of the dam under the same and communicating with the inlet and outlet openings, in combination with a floor having holes extending vertically from said chambers up to the gates, substantially as and for the purposes described.

2. A bear-trap dam, in combination with a shaft extending under the gate, and pitmen pivotally connected to such shaft and gate, substantially as and for the purposes described.

3. A lock having a bear-trap gate or gates, in combination with a forebay communicating with the upper pool and with the under side of the gate or gates, and an elevated tail-chute for sustaining the gate at the desired level, substantially as and for the purposes described.

4. A lock having a bear-trap gate or gates, in combination with inlet and outlet passages controlled by suitable valves for admitting water to and discharging it from under the gate or gates, said valves being connected with and operated by a common shaft, whereby the outlet-passages are closed as the inlet-passages are opened, and vice versa, substantially as and for the purposes described.

5. A lock having a bear-trap gate, in combination with a forebay, an intermediate supply-chamber, passages controlled by valves leading from the forebay to the supply-chamber and from the supply-chamber to below the gate, a discharge-passage leading from under the gate, and a valve controlling said passage, whereby the entrance of the water to the gate and its discharge therefrom may be regulated or controlled, substantially as and for the purposes described.

6. The combination, in a bear-trap dam, of an inlet or discharge valve, with devices for causing the closing or opening of the same, respectively, automatically by the gate itself when raised to an abnormal height, substantially as and for the purposes described.

7. The combination, in a bear-trap dam, of inlet and discharge passages controlled by valves, with devices for automatically closing and opening the same, respectively, by the gate itself when raised to an abnormal height, substantially as and for the purposes described.

8. The combination, with a bear-trap dam having inlet-passages through the end wall for admitting the water under the dam to raise it, of an inlet-valve secured to one end of a pivoted lever, tanks or buckets with a retarded outlet mounted on the other end of the lever, and when filled capable of overbalancing and thereby opening or closing the valve, and a pipe for discharging water into the buckets, substantially as and for the purposes described.

9. The combination of a bear-trap dam, which opens below the lower level of the stream, with devices for raising and discharging the water from under the gate, substantially as and for the purposes described.

10. The combination of a bear-trap dam which when open is below the lower level of the stream, with an elevated forebay, turbine wheels placed and operating in the forebay, and pumps placed below the level of the gate and operated by the turbine wheels for raising and discharging the water from under the gate, substantially as and for the purposes described.

11. In combination with a bear-trap dam having outlet-valves, a paddle or bucket placed above the ordinary level of the stream so as to be acted upon thereby when at an abnormal height, and power connections between the said paddle and the outlet-valves of the dam, substantially as and for the purposes described.

In testimony whereof I have hereunto set my hand this 23d day of June, A. D. 1883.

ARTHUR KIRK.

Witnesses:
 W. B. CORWIN,
 T. B. KERR.